W. B. KERRICK.
SPRING WHEEL.
APPLICATION FILED APR. 10, 1916.
1,237,913.
Patented Aug. 21, 1917.
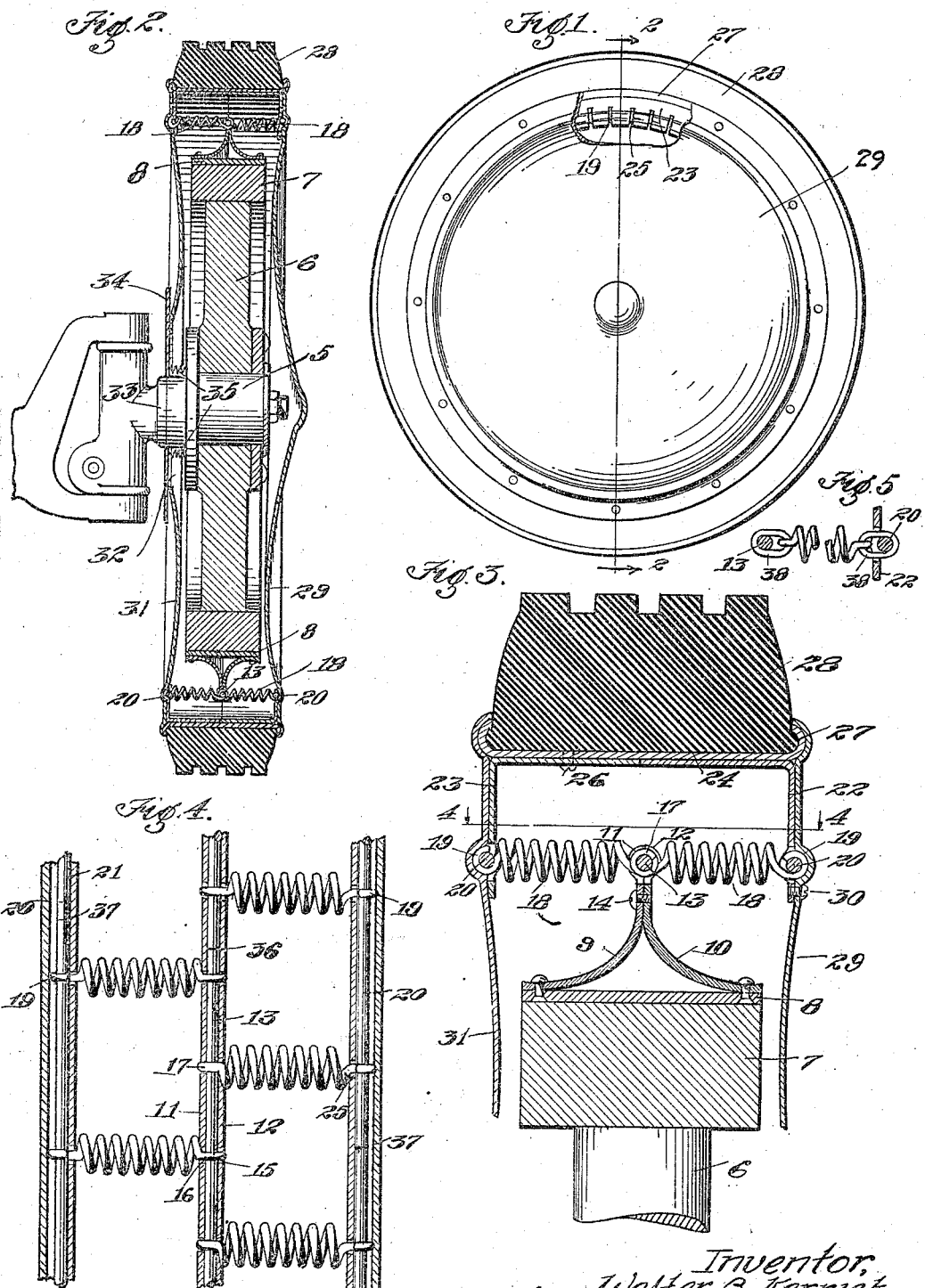
Inventor,
Walter B. Kerrick.
by Hazard Berry & Miller
attys.

UNITED STATES PATENT OFFICE.

WALTER B. KERRICK, OF LOS ANGELES, CALIFORNIA.

SPRING-WHEEL.

1,237,913.  Specification of Letters Patent.  Patented Aug. 21, 1917.

Application filed April 10, 1916. Serial No. 90,227.

*To all whom it may concern:*

Be it known that I, WALTER B. KERRICK, a citizen of the United States, residing at Los Angeles, in the county of Los Angeles and State of California, have invented new and useful Improvements in Spring-Wheels, of which the following is a specification.

This invention relates to a spring wheel and particularly pertains to the rim construction thereof.

It is the object of this invention to provide a wheel in which shocks imposed upon the wheel rim and loads carried upon the wheel hub will be cushioned on a series of spring members interposed between inner and outer relatively movable wheel rims and which permits the use of solid cushion tires for silence and traction in lieu of pneumatic tires but with substantially the same resilient qualities inherent in the latter.

Another object is to provide a wheel rim embodying a series of horizontally extending coiled springs with simple means for detachably mounting the terminals of the springs.

Another object is to provide a connection between the springs and the outer wheel rim whereby the latter may be removed and replaced without disconnecting the springs.

A further object is to provide a construction for the inner and outer wheel rims which will adapt them to being formed of sheet metal thus rendering the structure simple and economical in manufacture.

Other objects will appear hereinafter.

The invention is illustrated in the accompanying drawings in which:

Figure 1 is a view of a wheel constructed in accordance with this invention, as seen in side elevation, with parts broken away.

Fig. 2 is an enlarged detail vertical section of the wheel as seen on the line 2—2 of Fig. 1.

Fig. 3 is an enlarged detail section of the wheel rims.

Fig. 4 is a horizontal section and plan view as seen on the line 4—4 of Fig. 3 illustrating the manner of detachably connecting the ends of the springs.

Fig. 5 is a detail showing a modified form of the detachable spring connection.

More specifically, 5 indicates a wheel hub fitted with spokes 6 on which a felly 7 is mounted. The hub, spokes and felly may be of any suitable construction but are here shown as comprising those of the ordinary wooden wheel. Mounted on the felly 7 is a metallic rim 8 and affixed to the rim 8 is a pair of annular members 9 and 10 of arcuate cross section and arranged back to back with their curved portions extending in opposite directions. Formed on the adjacent faces of the members 9 and 10 at their outer edges are opposed annular channels 11 and 12 adapted to receive and encompass a ring 13. The ring 13 is interposed between the members 9 and 10 and the latter are detachably secured together by screws or bolts 14. The outer edges of the members 9 and 10 are formed with transverse slots 15 and 16 across which the ring 13 extends thus exposing portions of the ring throughout the periphery of the members 9 and 10. A central annular web is thus formed around the wheel felly with a series of slots spanned by a member consisting of the ring 13 which serves as an attachment to receive the hooked ends 17 of a series of coiled springs 18; a series of springs 18 being detachably connected to the web in this manner at suitable intervals throughout its periphery, which springs are arranged so that adjacent springs will extend on opposite sides of the web, as particularly shown in Fig. 4.

The outer ends of the springs 18 are formed with hooks 19 adapted to detachably engage rings 20 substantially corresponding to the ring 13. The rings 20 are designed to seat in annular channels 21 formed on the outer faces of flange rings 22 and 23 carried on an outer wheel rim 24. The flange rings 22 and 23 are arranged on opposite sides of the web on the wheel felly in such position that the outer wheel rim 24 will be spaced from the web, and the rings 20 will be in line with the ring 13 and so that the springs 18 will extend in a substantially horizontal direction. The flange rings 22 and 23 are formed with radial slots 25 on their inner edges which are spanned by the rings 20 and permit the hooked ends of the springs 18 being introduced into engagement with the rings. The flange rings 22 and 23 are preferably demountably connected to the rim 24; screws 26 being here shown as a means for effecting such connection. The rim 24 is formed with integral side flanges 27 to form a peripheral channel on its outer face adapted to receive a solid cushion tire 28.

Extending across the outer face of the wheel is a face plate 29 which closes the space encircled by the flange ring 22; the face plate 29 being detachably connected at its edges to the flange ring by means of screws 30. A back plate 31 is connected to the flange ring 23 and is formed with a central opening 32 through which the wheel spindle 33 extends. The margin of the opening 32 is spaced from the wheel spindle and the opening thus formed is closed by a plate 34 slidably engaging the wheel hub 5 and connected to the latter by means of torsional springs 35 which are attached to the hub and to the plate 34 and exert an inward pull on the latter normally maintaining it in close contact with the inner edge of the back plate 31.

From the foregoing it will be seen that the outer wheel rim may have radial, transverse and peripheral movement in relation to the inner wheel rim, or a combination of any of these movements, its movement in either of these directions being yieldably opposed by the springs 18, thus providing a resilient tread for the wheel having substantially the same resilient characteristics of a pneumatic tire.

By the construction here shown the springs 18 may be removed separately without disturbing adjacent springs, by unhooking their ends from the rings 13 and 20 and if it is desired to remove the outer wheel rim 24 without disturbing the springs, this operation may be effected by disconnecting same from the flange rings 22 and 23.

The rings 13 and 20 are preferably split, as indicated at 36 and 37 in Fig. 4, so as to permit their being expanded or contracted to conform to their receiving channels.

In assembling the wheel rim the ring 13 is placed in a groove formed by the channels 11 and 12 in the annular members 9 and 10 whereupon the latter are secured together and fastened to the rim 8. The members 9 and 10 may be secured together before mounting on the rim 8 or one of the members may be attached to the rim before the other is connected thereto. The springs 18 are then hooked at their inner ends over the ring 13 either from the inner or outer side thereof and arranged with adjacent springs extending in opposite directions. The rings 20 are then placed in their channels on the flange rings 22 and 23 and the outer ends of the springs 18 are engaged therewith, as shown in Fig. 3. The outer rim 24 carrying the tire 28 may then be secured to the flange rings 22 and 23.

Any other steps may be employed in assembling the rim as occasion may require.

Other means for detachably connecting the springs to the demountable rings may be employed, such, for instance, as is illustrated in Fig. 5, in which loops 38 are mounted on the rings to extend through the slots and to which rings the hook ends of the springs are detachably connected. A connection is thus formed which will permit of universal movement of the springs in relation to the rings without binding or pinching the spring ends.

By the construction herein set forth an inner wheel is mounted to have cushioned universal movement within an outer wheel; the two wheels being capable of having transverse, radial, and circumferential movement, or any combination of these movements in relation to each other, with any movement being cushioned by the springs.

What I claim is:

1. In a wheel, a pair of spaced wheel rims, an annular web on the inner rim having a slotted peripheral edge, a ring carried by said web spanning the slots therein, a series of springs detachably connected to said ring and arranged with adjacent springs extending on opposite sides of the web, and means for detachably connecting the outer ends of said springs to the outer rim.

2. In a wheel, an inner rim, an outer rim spaced therefrom, a web on the inner rim formed with transverse slots, a ring carried by said web spanning said slots, springs detachably connected to the ring in said slots extending on opposite sides of the web, flange rings carried by the outer rim having slots on their inner edges, and rings carried by said flange rings to which the outer ends of said springs are detachably connected.

3. In a wheel, an inner rim, an outer rim spaced therefrom, a pair of annular members connected to the inner rim and formed with channels adjacent their outer edges and having alined transverse slots, a ring carried in said channels extending across the slots, coiled springs having hooked terminals arranged with their inner ends connected to said ring, flange rings carried by the outer rim having slots on their inner edges and extending on opposite sides of the annular members, and rings carried by said flange rings spanning the slots to which the outer hooked ends of said springs are detachably connected.

4. In a wheel, the combination with a wheel felly, of an annular tire positioned therearound and in spaced relation to said felly, a pair of oppositely disposed outer rings adapted to lie between the felly and the tire, a central ring of a similar diameter to the outer rings and disposed between said outer rings, helical spring members adapted to detachably engage adjacent ring members and arranged in staggered relation to each other as they engage alternate pairs of rings, means whereby the central ring may be detachably mounted upon the felly, and means whereby the outer rings may be mounted in fixed relation to the tire.

In testimony whereof I have signed my name to this specification.

WALTER B. KERRICK.

Copies of this patent may be obtained for five cents each, by addressing the "Commissioner of Patents, Washington, D. C."